US012128826B2

(12) United States Patent
Philipp et al.

(10) Patent No.: US 12,128,826 B2
(45) Date of Patent: Oct. 29, 2024

(54) MULTI-DIRECTIONAL VIEWING CAMERA SYSTEM

(71) Applicant: GM GLOBAL TECHNOLOGY OPERATIONS LLC, Detroit, MI (US)

(72) Inventors: Tzvi Philipp, Bet Shemesh (IL); Igal Kotzer, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 459 days.

(21) Appl. No.: 17/551,600

(22) Filed: Dec. 15, 2021

(65) Prior Publication Data

US 2023/0182641 A1 Jun. 15, 2023

(51) Int. Cl.
| | |
|---|---|
| B60R 1/08 | (2006.01) |
| B60R 1/00 | (2022.01) |
| B60R 1/12 | (2006.01) |
| B60R 1/25 | (2022.01) |
| B60R 1/28 | (2022.01) |
| G02B 5/30 | (2006.01) |
| G02B 27/28 | (2006.01) |

(52) U.S. Cl.
CPC ............ *B60R 1/087* (2013.01); *B60R 1/006* (2013.01); *B60R 1/12* (2013.01); *B60R 1/25* (2022.01); *B60R 1/28* (2022.01); *G02B 5/3016* (2013.01); *G02B 27/286* (2013.01)

(58) Field of Classification Search
CPC ............................. G02B 5/3016; G02B 27/286
USPC ........................................................... 359/604
See application file for complete search history.

(56) References Cited

U.S. PATENT DOCUMENTS

2014/0078306 A1 3/2014 Miyoshi et al.
2014/0285666 A1* 9/2014 O'Connell ............... B60R 1/28
348/148

FOREIGN PATENT DOCUMENTS

| JP | 2003259165 A | 9/2003 |
| JP | 2004255903 A | 9/2004 |
| JP | 2010254085 A | 11/2010 |

\* cited by examiner

*Primary Examiner* — Jerry L Brooks
(74) *Attorney, Agent, or Firm* — Quinn IP Law

(57) ABSTRACT

A multi-directional viewing camera system for a motor vehicle including a vehicle body defining an interior compartment and a body panel having an exterior surface and an interior surface facing the interior compartment. The camera system includes a mirror module for mounting to the body panel exterior surface. The mirror module is configured to capture and transmit incident light from at least one field of view (FOV) and has a polarizing beam splitter configured to reflect an s-polarized component and transmit a p-polarized component of the incident light in a visible spectral range. The camera system also includes a camera module having a video camera for mounting to the body panel interior surface. The camera module is configured to receive from the mirror module the s-polarized or the p-polarized component of the incident light and selectively display at least one FOV within the interior compartment.

20 Claims, 6 Drawing Sheets

MULTI-DIRECTIONAL VIEWING CAMERA SYSTEM

INTRODUCTION

The present disclosure relates to a multi-directional viewing camera system for a motor vehicle.

A side-view mirror (or side mirror) is a mirror placed on an exterior panel of a motor vehicle to help the vehicle's operator see areas behind and to the sides of the vehicle, outside the driver's peripheral vision (in the blind spot). Most modern vehicles mount their side mirrors on the doors, normally at the A-pillar. A typical side mirror is equipped for manual or remote vertical and horizontal adjustment to provide adequate coverage to drivers of differing height and seated position.

Some modern motor vehicles employ side mirrors in the form of a video camera system with a display for the vehicle operator's enhanced peripheral recognition while driving. Generally, such systems have advantages over conventional mirrors via providing a wider angle of sight and less air resistance without obstructing the driver's frontal view. Such camera systems generally arrange the camera itself on an external vehicle body surface, typically where a traditional mirror would be, and position the display inside the vehicle passenger compartment.

SUMMARY

A multi-directional viewing camera system for a motor vehicle including a vehicle body defining an interior compartment and a body panel having an exterior surface and an interior surface facing the interior compartment. The multi-directional viewing camera includes a mirror module for mounting to the exterior surface of the body panel. The mirror module is configured to capture and transmit incident light from at least one field/region of view (FOV) and has a polarizing beam splitter configured to reflect an s-polarized component and transmit a p-polarized component of the incident light in a visible spectral range. The multi-directional viewing camera also includes a camera module having a video camera for mounting to the interior surface of the body panel. The camera module is configured to receive from the mirror module one of the s-polarized and the p-polarized component of the incident light and selectively display the at least one FOV within the interior compartment.

The camera module may additionally include an electronically controlled polarizer arranged between the video camera and the polarizing beam splitter and configured to selectively transmit and reflect light.

The electronically controlled polarizer may be a liquid crystal optical element.

The at least one FOV may include at least two of the individually selectable rearward, side, and forward FOV's.

The multi-directional viewing camera system may additionally include an electronic controller configured to regulate voltage across the polarizer to selectively transmit and reflect light. The electronic controller is thereby configured to facilitate switching between the at least two of individually selectable rearward, side, and forward FOV's of the viewing camera system.

The mirror module may additionally include a first polarizing filter configured to transmit the s-polarized component of the incident light, arranged perpendicular to the body panel, and facing the rearward FOV to receive the incident light.

A light blocker may be arranged parallel to the first polarizing filter and configured to select between a light passing mode and a light blocking mode, wherein the light passing mode is configured to facilitate displaying the rearward FOV and the light blocking mode is configured to facilitate displaying the forward FOV. Alternatively, the first polarizing filter may be electronically controlled to select between a light passing mode and a light blocking mode, and wherein the light blocking mode is configured to facilitate displaying the forward FOV.

The mirror module may additionally include a second polarizing filter configured to transmit the s-polarized component of the incident light, arranged perpendicular to the body panel, and facing the forward FOV to receive the incident light.

The mirror module may additionally include a polarization mirror and a quarter wave plate arranged sequentially relative to the incident light from the side FOV and parallel to the body panel. The polarization mirror may face the side FOV to receive the incident light therefrom. In such an embodiment, the polarizing beam splitter may be arranged between the video camera and the quarter wave plate.

The polarization mirror may be electronically controlled and configured to selectively transmit and reflect light, and the quarter wave plate may be configured to add a constant phase factor to polarized light transmitted by the polarization mirror.

Also disclosed is a motor vehicle having such a multi-directional viewing camera system. The multi-directional viewing camera system may be mounted to a body panel configured as a vehicle door having its interior surface facing the vehicle's passenger compartment.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above," "below," "upward," "downward," "top," "bottom,", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
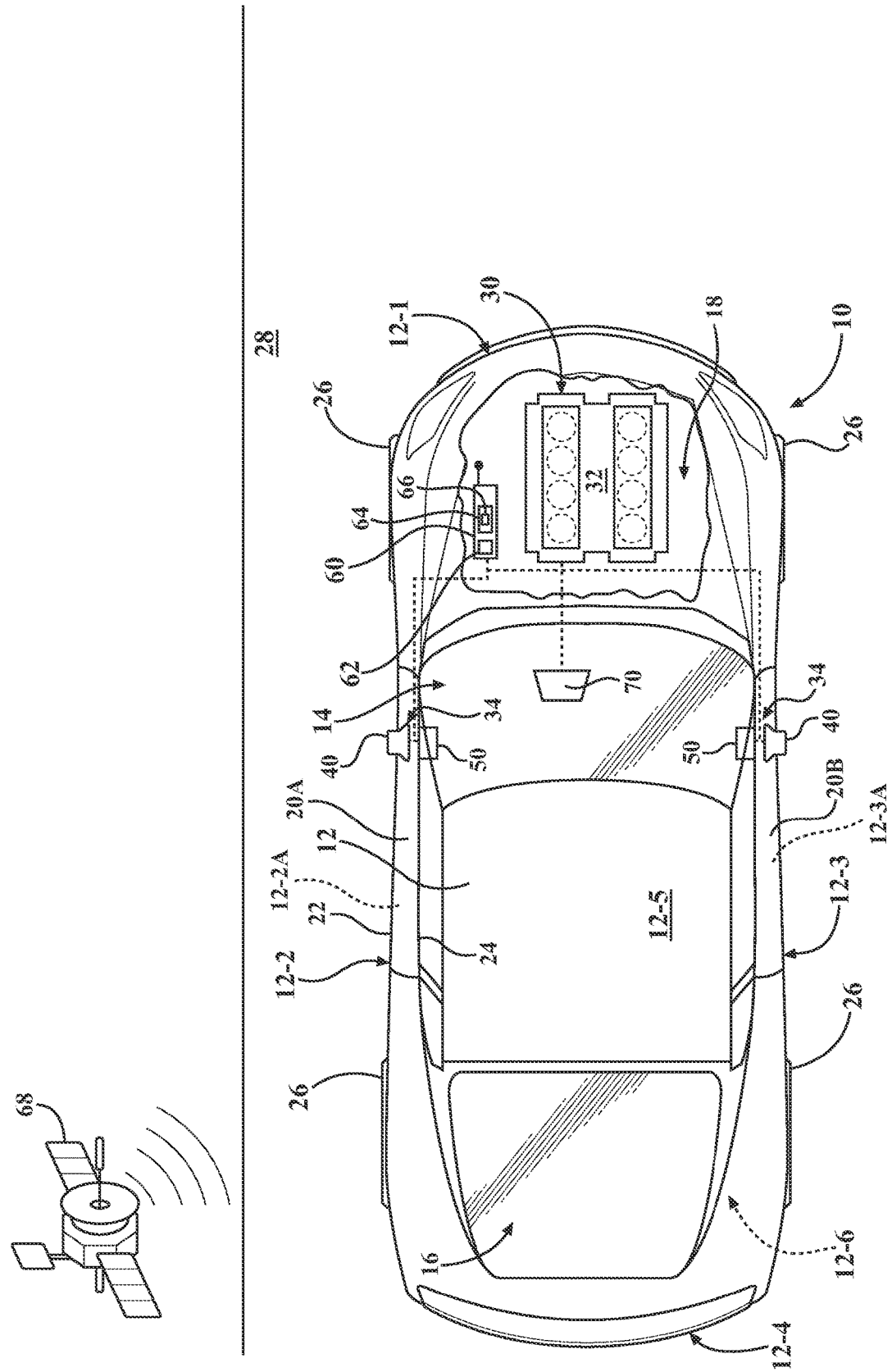
FIG. 1 is a plan view of a motor vehicle having a multi-directional viewing camera system mounted to the vehicle body panel and having a mirror module and a camera module, according to the present disclosure.

Referring to the drawings, wherein like reference numbers refer to like components, FIG. 1 shows a schematic view of a motor vehicle 10, which includes a vehicle body 12. As shown, the vehicle body 12 may have a leading side or front end 12-1, a left body side 12-2, right body side 12-3, a trailing side or back end 12-4, a top side or section, such as a roof, 12-5, and a bottom side or undercarriage 12-6. The body sides 12-1 through 12-6 generally define and enclose an interior compartment, such as a passenger compartment 14, a cargo compartment 16, and a powertrain compartment 18. The body sides 12-2, 12-3 may include respective body panels 20A, 20B. The body sides 12-2, 12-3 may also define respective body openings 12-2A, 12-3A.

In an embodiment of the vehicle 10 having body openings 12-2A, 12-3A, panels 20A, 20B may be operable as doors configured to selectively cover and uncover the corresponding openings 12-2A, 12-3A for access to the passenger compartment 14, and optionally to the cargo compartment 16. Alternatively, body panels 20A, 20B may be configured as fixed elements, such as bolt-on fenders or structural pillars (not shown, but understood by those skilled in the art). Each body panel 20A, 20B has an exterior surface 22 and an interior surface 24. The exterior surface 22 of each body panel 20A, 20B faces the ambient environment and the interior surface 24 faces the internal compartments of the vehicle 10. Specifically, the interior surface 24 of the door embodiment of body panels 20A, 20B faces the passenger compartment 14.

The vehicle 10 may include a plurality of road wheels 26. Although four wheels 26 are shown in FIG. 1, a vehicle with fewer or greater number of wheels, or having other means, such as tracks (not shown), of traversing a road surface 28 or other terrain is also envisioned. The vehicle 10 also includes a powertrain 30 generally situated inside the powertrain compartment 18. The powertrain 30 includes a power-plant 32, such as an internal combustion engine (shown) and/or a traction motor (not shown), for generating on-demand power-plant torque. The powertrain 30 may also include a transmission (not shown) operatively connecting the power-plant 32 to at least some of the road wheels 26 for transmitting power-plant torque thereto and thereby putting the vehicle 10 in motion.

As shown in FIG. 1, the vehicle 10 also includes a multi-directional viewing camera system 34. The multi-directional viewing camera system 34 is configured to receive from multiple directions external to the vehicle 10 incident light 36 and display inside the vehicle individually selectable regions or fields of view (FOV's), specifically a rearward FOV 38A, a side FOV 38B, and a forward FOV 38C (shown in FIG. 2). Although the multi-directional viewing camera system 34 may be used to selectively display various FOV's, such as at least two of the 38A, 38B, 38C FOV's, the camera system may also be set up to lock in on a single FOV, such as the rearward FOV 38A. The multi-directional viewing camera system 34 includes a mirror module 40 and a camera module 50 operatively connected to the mirror module 40 (shown in FIGS. 1-6).

The multi-directional viewing camera system 34 may also include an electronic controller 60 operatively connected to each of the mirror module 40 and the camera module 50. The electronic controller 60 may alternatively be referred to as a control module, a control unit, a controller, a vehicle 10 controller, a computer, etc. The electronic controller 60 may include a computer and/or processor 62, and include software, hardware, memory, algorithms, connections, etc., for managing and controlling operation of various systems and functions of the vehicle 10. The electronic controller 60 may be embodied as one or multiple digital computers or host machines each having one or more processors 62, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics.

The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk or hard disk, magnetic tape or other magnetic medium, a CD-ROM, DVD, and/or other optical medium, as well as other possible memory devices such as flash memory. The electronic controller 60 also includes a tangible, non-transitory memory 64 on which are recorded computer-executable instructions, including one or more algorithms, for regulating operation of the motor vehicle 10. Algorithms required by the controller 60 or accessible thereby may be stored in the memory and automatically executed to provide the required functionality.

The subject algorithm(s) may specifically include an algorithm 66 for regulating operation of the multi-directional viewing camera system 34, for example to assist autonomous or semi-autonomous operation of the motor vehicle 10. The electronic controller 60 may therefore be in wireless communication with a global positioning satellite (GPS) 68 via a vehicle navigation system 70 arranged inside the vehicle passenger compartment 14. The electronic controller 60 may capture images obtained via the multi-directional viewing camera system 34 and use such images along with the data received from the GPS 68 in a perception and/or image recognition algorithm to assess position of the vehicle 10 relative to the terrain being traversed thereby in real time, as well as classify, identify, and localize objects captured in the FOV's. Thus assessed, the position of the vehicle 10, along with the objects data, may be employed to navigate the vehicle across the terrain with or without operator input. As such, regulation of the multi-directional viewing camera system 34, described in detail below and generally represented in FIGS. 2-6, may be embodied in a program or algorithm operable on the electronic controller 60.

As shown in FIGS. 2-6, the aforementioned mirror module 40 of the camera system 34 is mounted within a housing 40A to the exterior surface 22 of the individual body panel 20A, 20B. The mirror module 40 is configured to capture and transmit the incident light 36 from at least one FOV, e.g., the rearward FOV 38A, side FOV 38B, and forward FOV 38C. In its most complex embodiment (shown in FIG. 2), the mirror module 40 may be configured to selectively transmit incident light 36 from each of the rearward FOV 38A, side FOV 38B, and forward FOV 38C. The mirror module 40 includes a polarizing beam splitter 44. The polarizing beam splitter 44 is an optical element active in the visible spectral range of about 380 to 750 nanometers. The polarizing beam splitter 44 has a fixed optical orientation configured to reflect an s-polarized component 36A of the incident light 36 in the visible spectral range and transmit a p-polarized component 36B of the incident light in the visible spectral range for each of the rearward FOV 38A, side FOV 38B, and forward FOV 38C. As generally understood, p-polarized light has an electric field direction parallel to the plane of incidence on a device, and s-polarized light has the electric field oriented perpendicular to that plane. The polarizing beam splitter 44 is configured to support the visible spectral range over an angle of incidence of light corresponding to the selected FOV, while maintaining its polarization selective behavior.

Figure 2:
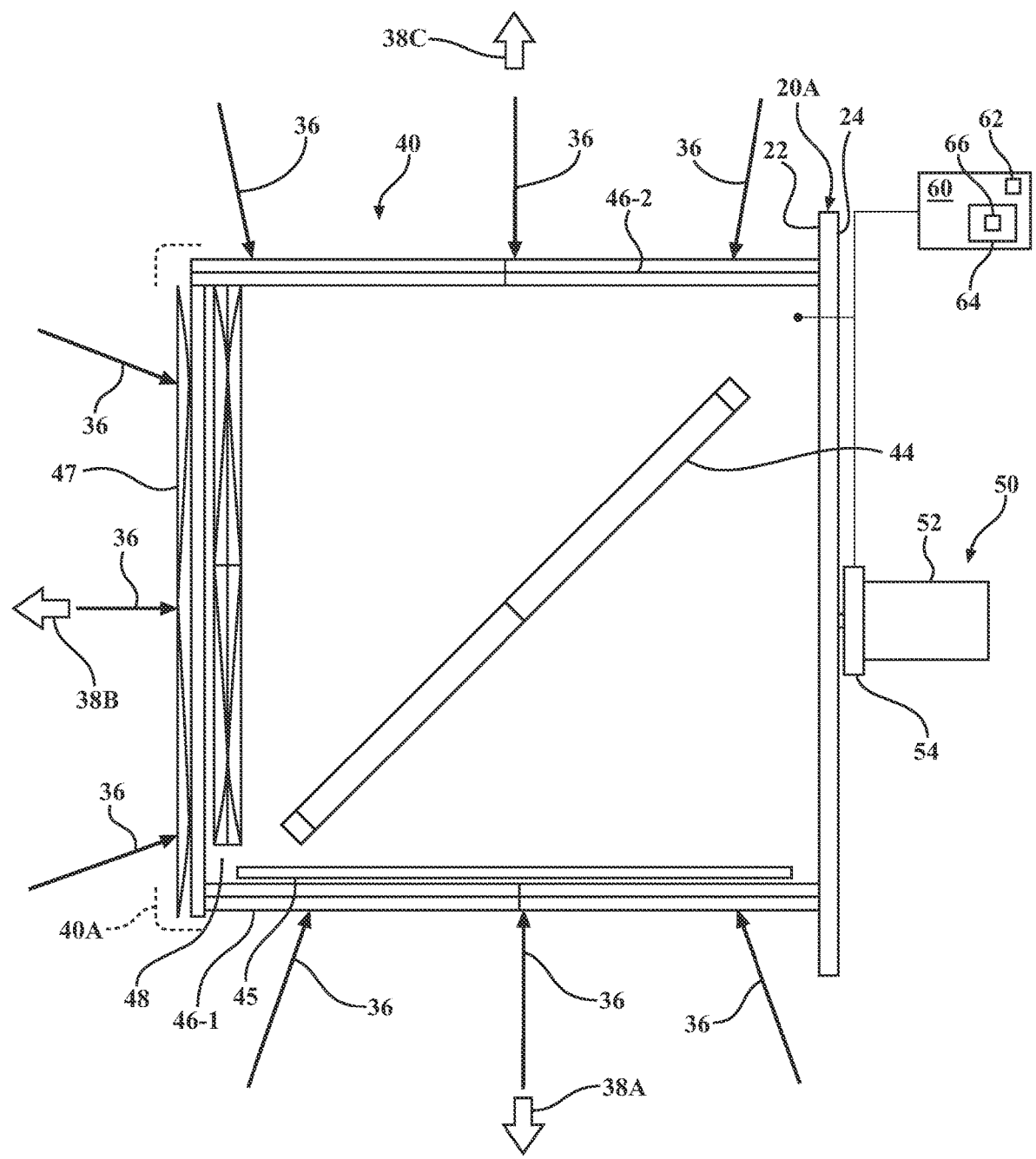
FIG. 2 is an enlarged schematic partial cross-sectional view of an embodiment of the multi-directional viewing camera system shown in FIG. 1, including optical devices for selective generation and display of rearward, side, and forward fields of view (FOV's), according to the present disclosure.
Figure 3:
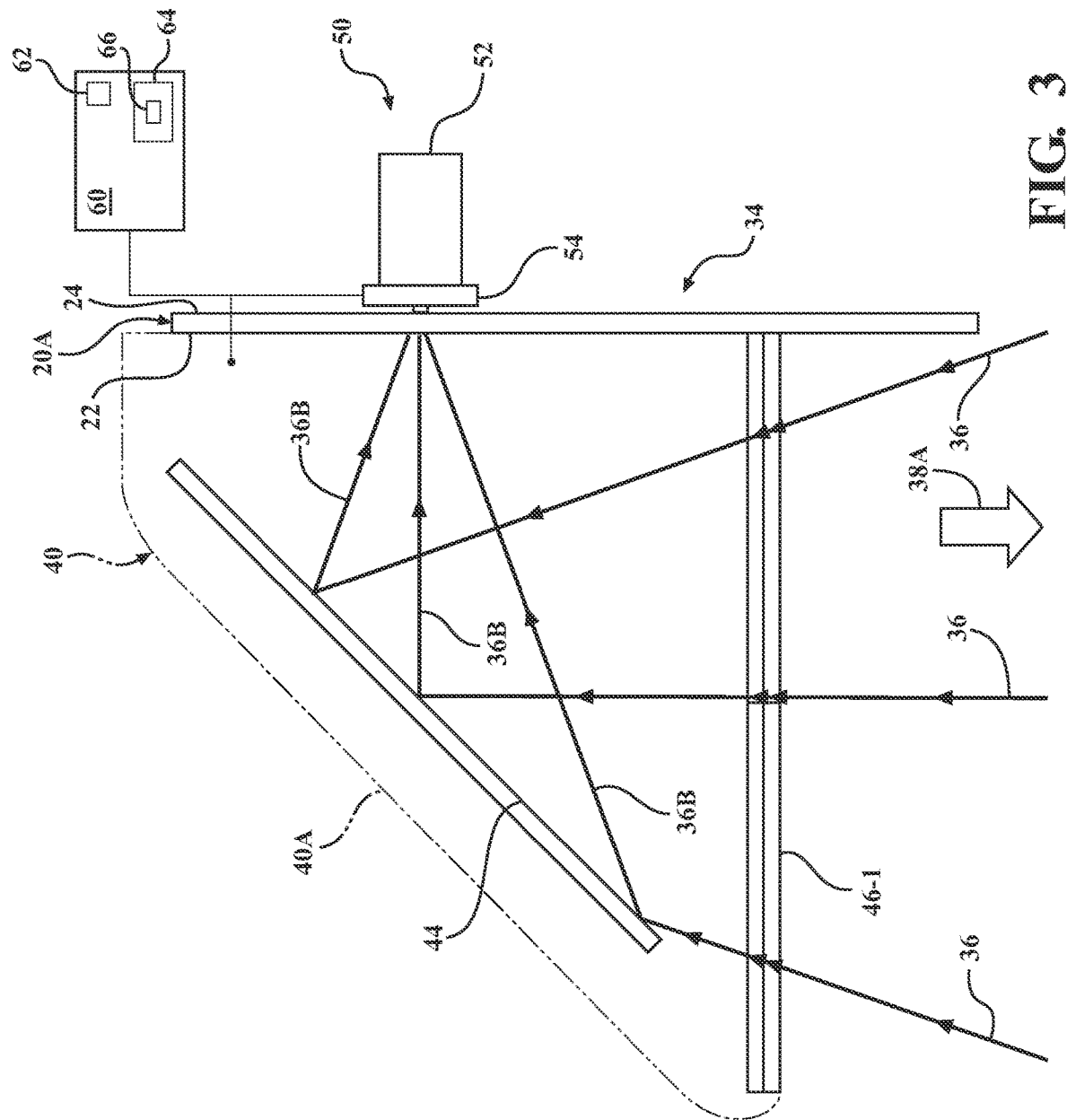
FIG. 3 is an enlarged schematic partial cross-sectional view of an embodiment of the multi-directional viewing camera system shown in FIG. 2, illustrating a path of incident light from the rearward FOV through the camera system, according to the present disclosure.
Figure 4:
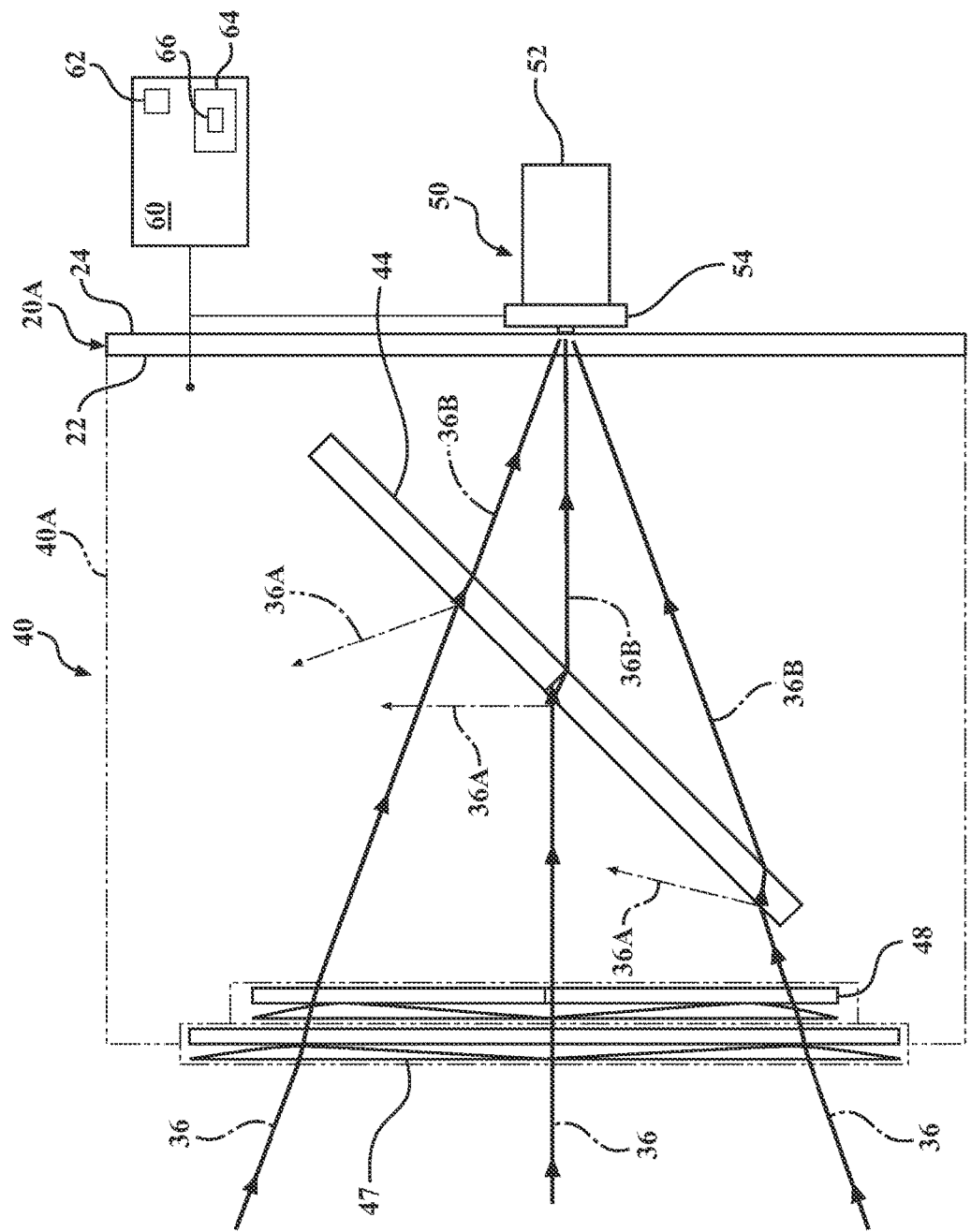
FIG. 4 is an enlarged schematic partial cross-sectional view of an embodiment of the multi-directional viewing camera system shown in FIG. 2, illustrating a path of incident light from the side FOV through the camera system, according to the present disclosure.

As shown in FIG. 2, the polarizing beam splitter 44 may be arranged at approximately 45-degree angle relative to the corresponding body panel 20A or 20B. Arranged in such fashion, the polarizing beam splitter 44 may be specifically configured to reflect the s-polarized component 36A of the incident light 36 for displaying the rearward FOV 38A. Furthermore, such position of the polarizing beam splitter 44 may be employed to transmit the p-polarized component 36B of the incident light 36 for selectively displaying the side FOV 38B and the forward FOV 38C. The polarizing beam splitter 44 may be configured as substantially flat element having parallel sides (shown in FIGS. 2-5) or have a wedge shape (shown in FIG. 6) intended to minimize ghost images and other optical artifacts generated by stray light. The wedge-shaped polarizing beam splitter 44 may include distinct inclination angles for the opposing light incident sides, i.e., the side facing the rearward FOV 38A and the side facing the forward FOV 38C.

As shown in FIG. 2, the mirror module 40 may additionally include a light blocker 45 and a first polarizing filter 46-1. The light blocker 45 is configured to facilitate displaying the forward FOV 38C, while the polarizing filter 46-1 is configured to facilitate displaying the rearward FOV 38A. Specifically, the first polarizing filter 46-1 may be arranged substantially perpendicular to the corresponding body panel 20A or 20B and facing the rearward FOV 38A to receive the incident light 36. When combined with the light blocker 45, the first polarizing filter 46-1 may have a fixed optical orientation to transmit the s-polarized component 36A of the incident light 36. As shown, the light blocker 45 is arranged parallel to the first polarizing filter 46-1 and configured to select between a light passing or transmitting mode and a light blocking mode. The light blocker 45 may be regulated via the electronic controller 60 to select between the light blocker's light passing mode and light blocking mode.

The light passing mode of the light blocker 45 is configured to enable incident light 36 access to the polarizing beam splitter 44 through the first polarizing filter 46-1 and thereby facilitate displaying the rearward FOV 38A. Conversely, the light blocking mode of the light blocker 45 is configured to impede the incident light 36 from the rearward FOV 38A from accessing the polarizing beam splitter 44 and thereby facilitate displaying the forward FOV 38C without overlayed or ghost images from the rearward FOV 38A. Alternatively, the first polarizing filter 46-1 may have a variable optical orientation to enable operation of the mirror module 40 without incorporation of the light blocker 45. The variable optical orientation first polarizing filter 46-1 may be regulated via the electronic controller 60, such as by varying voltage across the first polarizing filter, to select between the first polarizing filter's light passing and light blocking modes. The light blocking mode of the first polarizing filter 46-1 may be specifically configured to facilitate displaying the forward FOV 38C, while its light passing mode may be selected to facilitate displaying the rearward FOV 38A free of ghost images from the rearward FOV 38A.

Figure 5:
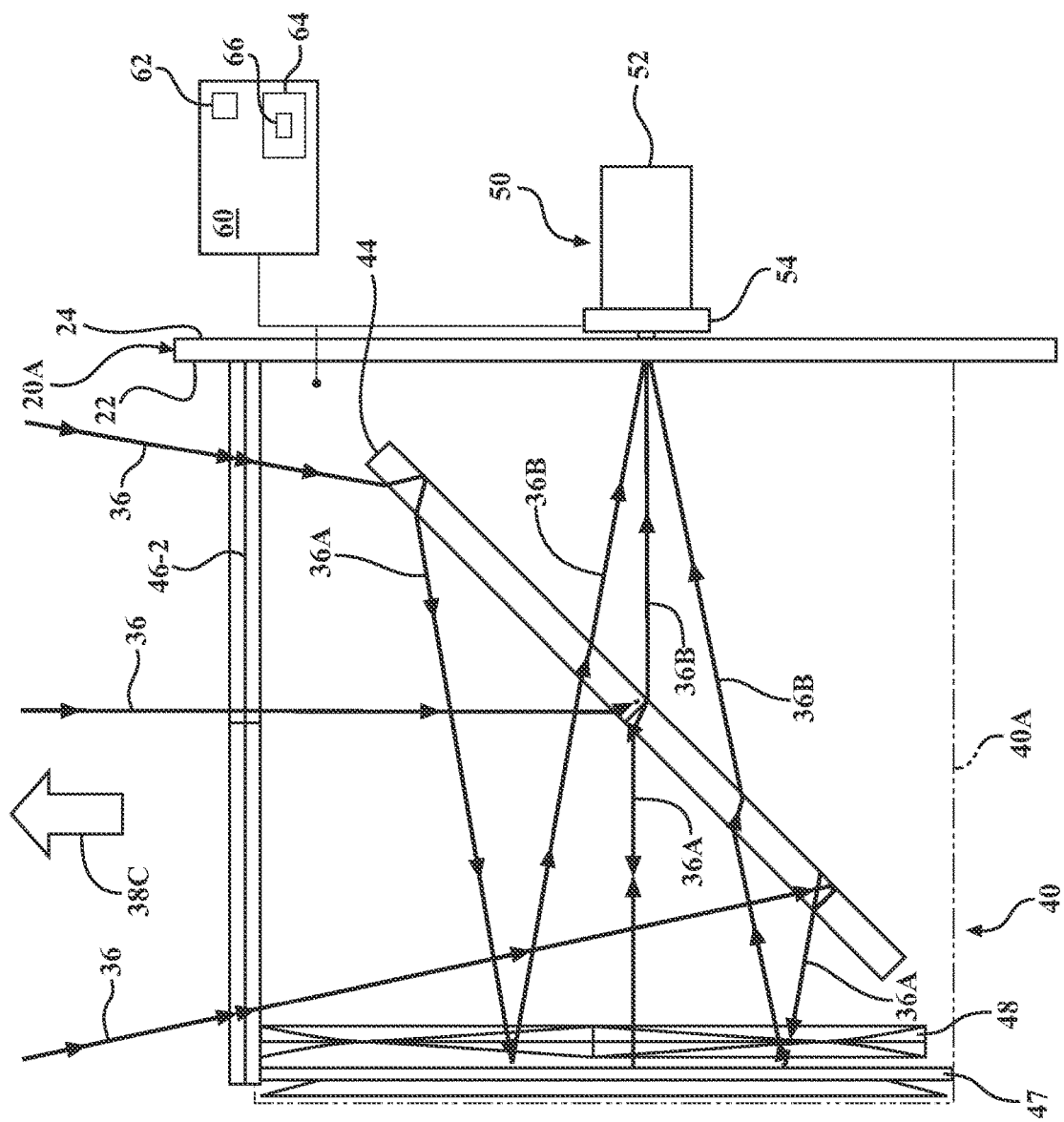
FIG. 5 is an enlarged schematic partial cross-sectional view of an embodiment of the multi-directional viewing camera system shown in FIG. 2, illustrating a path of incident light from the front FOV through the camera system, according to the present disclosure.
Figure 6:
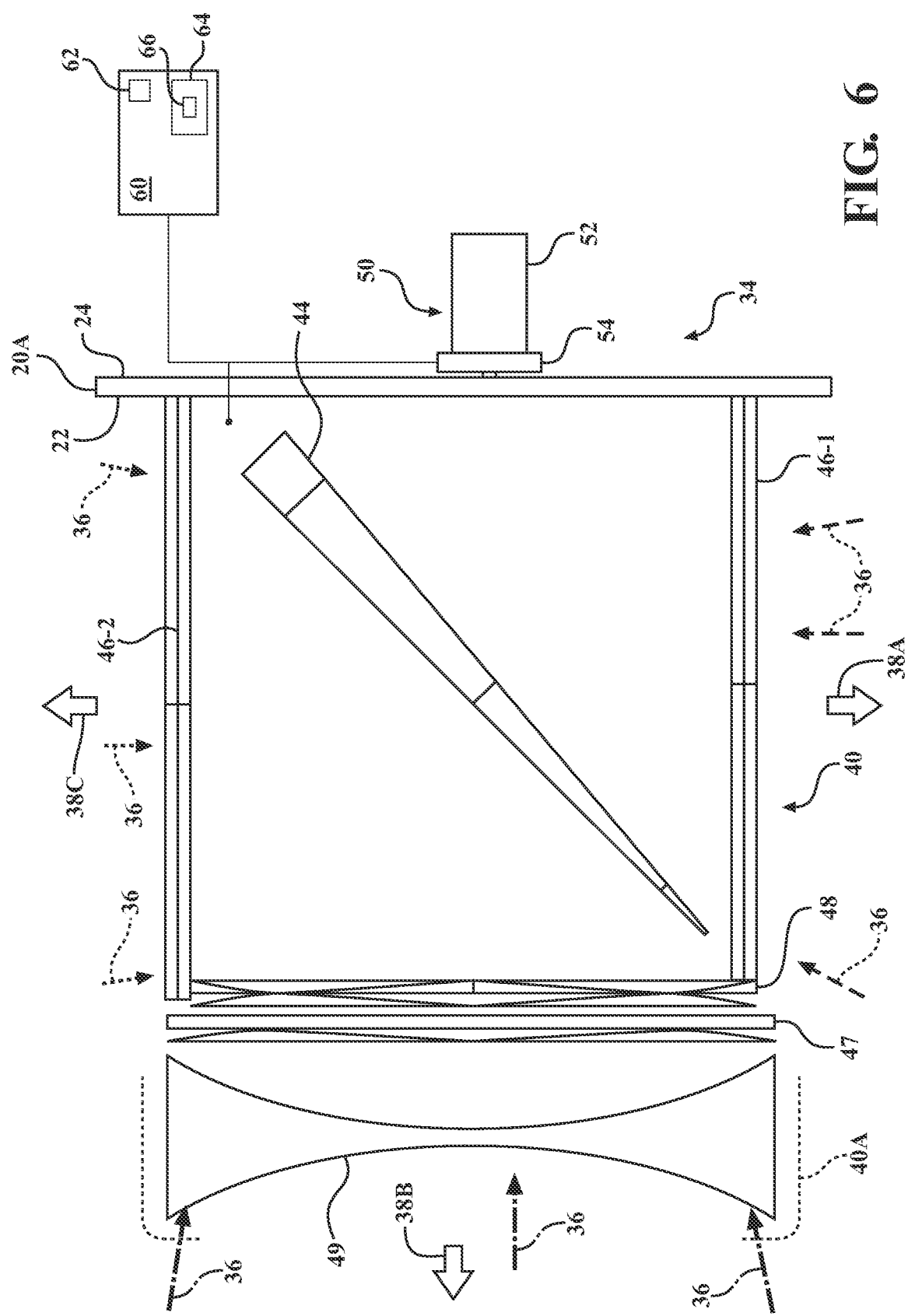
FIG. 6 is an enlarged schematic partial cross-sectional view of an embodiment of the multi-directional viewing camera system shown in FIG. 2, illustrating a negative lens for expanding the side FOV and a wedge-shaped polarizing splitter, according to the present disclosure.

As shown in FIGS. 2, 5, and 6, the mirror module 40 may additionally include a second polarizing filter 46-2 having a fixed optical orientation and configured to transmit the s-polarized component 36A of the incident light 36. The second polarizing filter 46-2 may be arranged substantially perpendicular to the corresponding body panel 20A or 20B and facing the forward FOV 38C to receive the incident light 36. Accordingly, second polarizing filter 46-2 is configured to enable the multi-directional viewing camera system 34 to capture and display the forward FOV 38C. As shown in FIGS. 2 and 4-6, the mirror module 40 may further include a polarization mirror 47 and a quarter wave plate 48 arranged sequentially relative to the path of the incident light 36 from the side FOV 38B, i.e., one after the other with respect to the optical flow. Also, as may be seen in the drawings, each of the polarization mirror 47 and the quarter wave plate 48 is positioned substantially parallel to the corresponding body panel 20A or 20B. Generally, a quarter wave plate will divide linearly polarized light which strikes the plate into two components with different indices of refraction. A quarter wave plate may be used to convert linearly polarized light to circularly polarized light and vice versa. This is typically accomplished by adjusting the plane of the incident light so that it makes a 45-degree angle with respect to the plate's optic axis. The polarization mirror 47 and a quarter wave plate 48 may be spaced apart such that a layer of air (not shown) is retained therebetween. The polarization mirror 47 may face the side FOV 38B to receive the incident light 36 therefrom, while the polarizing beam splitter 44 may be arranged between the video camera 52 and the quarter wave plate 48.

The polarization mirror 47 may be regulated via the electronic controller 60, such as by varying voltage across the polarization mirror to selectively transmit and reflect or block light. The polarization mirror 47 may be operated in light transmitting mode when the multi-directional viewing camera system 34 is commanded to display the side FOV 38B. Conversely, the polarization mirror 47 may be operated in light blocking mode when the multi-directional viewing camera system 34 is commanded to display the forward FOV 38C. The light blocking mode of the polarization mirror 47 is intended to minimize the possibility of ghost images appearing from the side FOV 38B during displaying of the forward FOV 38C. The quarter wave plate 48 may have a fixed optical orientation and be configured to add a constant phase factor to polarized light transmitted by the polarization mirror 47.

In general, when one particular FOV, 38A, 38B, or 38C, is selected, the other two FOV's will have the corresponding two of the first polarizing filter 46-1, second polarizing filter 46-2, and polarization mirror 47 in a crossed state, effectively blocking light from those other FOV's, and thereby preventing ghost images or stray light from appearing in the imaged FOV. As shown in FIG. 6, the mirror module 40 may additionally include a negative lens 49 to expand the side FOV 38B. The negative lens 49 may be positioned parallel to and in front of the polarization mirror 47, i.e., such that the negative lens and the quarter wave plate 48 extend along opposite sides of the polarization mirror.

The previously mentioned camera module 50 is operatively connected to the mirror module 40. As shown in FIGS. 2-6, the camera module 50 includes a video camera 52 mounted to the interior surface 24 of the body panel and configured to receive, i.e., collect, from the mirror module 40 either the s-polarized component 36A or the p-polarized component 36B of the incident light 36. The camera module 50 is additionally configured to selectively display, such as on a video screen (not shown), at least one of the rearward FOV 38A, side FOV 38B, and forward FOV 38C, within the interior compartment, e.g., the passenger compartment 14. Orientation of the video camera 52 screen may be adjustable relative to the passenger compartment 14 to accommodate the vehicle operator when positioned therein.

The camera module 50 may additionally include an electronically controlled polarizer 54 (shown in FIGS. 2-6). The polarizer 54 may be arranged between the video camera 52 and the polarizing beam splitter 44 and configured to selectively transmit and reflect light. The electronic controller 60 may be specifically configured to regulate voltage across the polarizer 54 to selectively transmit and reflect light, and thereby facilitate switching between at least two of the individually selectable rearward, side, and forward FOV's 38A, 38B, 38C displays of the viewing camera system 34. Specifically, for displaying the side FOV 38B the polarizer 54 may be switched to transmit to the video camera 52 the p-polarized component 36B of the incident light 36 received from the mirror module 40. For displaying the rearward FOV 38A and forward FOV 38C, the polarizer 54 may be switched to transmit to the video camera 52 the s-polarized component 36A of the incident light 36 received from the mirror module 40.

Each of the light blocker 45, the variable first polarizing filter 46-1, the polarization mirror 47, and the polarizer 54 may be configured as liquid crystal optical elements. Regulation of voltage across a liquid crystal element, e.g., light blocker 45, variable first polarizing filter 46-1, polarization mirror 47, and polarizer 54, changes the alignment of the liquid crystal molecules, which changes the phase of the incident light 36 passing through the subject liquid crystal element. A specifically polarized optical element, such as the polarizing beam splitter 44, positioned aft of the voltage controlled liquid crystal element will then transmit the component of light that is aligned with its polarization and reflect other light components. Accordingly, the subject liquid crystal element may be controlled via the electronic controller 60 in response to a request sent by an operator of the vehicle 10. For example, an operator request may be used to set the light blocker 45 or the first polarizing filter 46-1 in their respective light passing mode to enable the video camera 52 to display the rearward FOV 38A, or to set the light blocker 45 or the first polarizing filter 46-1 in their respective light blocking mode to enable the video camera 52 to display the side FOV 38B or the forward FOV 38C.

In the specific case when the rearward FOV 38A is selected (shown in FIG. 3), the incident light 36 will be transmitted through the first polarizing filter 46-1 and the s-polarized component 36A of the incident light 36 will be reflected by the polarizing beam splitter 44. The reflected s-polarized component 36A of the incident light 36 will then be focused by the imaging optics of polarizer 54 in the camera module 50, thus generating and displaying the rearward FOV 38A. In the specific case when the side FOV 38B is selected (shown in FIG. 4), the polarization mirror 47 will be operated in the light passing mode, with its opacity set to clear. The incident light 36 transmitted through the polarization mirror 47 will pass through the quarter wave plate 48 and then the p-polarized component 36B of the incident light 36 will pass through the polarizing beam splitter 44. Thus passed, the light will be focused by the imaging optics of polarizer 54 in the camera module 50 to generate and display the side FOV 38B.

In the specific case when the forward FOV 38C is selected (shown in FIG. 5), the polarization mirror 47 will be operated in the light blocking mode, changing its opacity from clear to reflective. The incident light 36 from the forward FOV 38C will be transmitted through the second polarizing filter 46-2 and will first strike and be reflected by the polarizing beam splitter 44 into the fixed quarter wave plate 48. The light will then propagate through the fixed quarter wave plate 48, be incident upon the polarization mirror 47 and be reflected thereby. Thus reflected, the light will then pass again through the quarter wave plate 48. Due to the second trip through the quarter wave plate 48, the light will pick up an additional phase shift, being transformed from circular polarized light to linear p-polarized component 36B of the incident light 36. The p-polarized component 36B will return to and be transmitted through the polarizing beam splitter 44. After being transmitted by the polarizing beam splitter 44, the light will be focused by the imaging optics of polarizer 54 in the camera module 50, thus generating and displaying the forward FOV 38C.

Overall, the multi-directional viewing camera system 34 includes a combination of externally arranged optical elements, some of which may be electronically controlled, in communication with an internally positioned video camera to provide selectable FOV's relative to the host vehicle 10. The optical elements of the multi-directional viewing camera system 34 are stationary relative to the vehicle 10 and thus require no moving components or mechanical actuation to permit capturing multiple FOV's and selective display thereof inside the vehicle. The multi-directional viewing camera system 34 may have the rearward FOV 38A set as the default operating state, to simulate a traditional reflective vehicle rearview mirror, with additional, capability of displaying on-demand the side or forward FOV's 38B, 38C.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A multi-directional viewing camera system for a motor vehicle including a vehicle body defining an interior compartment and a body panel having an exterior surface and an interior surface facing the interior compartment, the multi-directional viewing camera comprising:
   a mirror module for mounting to the exterior surface of the body panel, configured to capture and transmit incident light from at least one field/region of view (FOV), and having a polarizing beam splitter configured to reflect an s-polarized component of the incident light in a visible spectral range and transmit a p-polarized component of the incident light in the visible spectral range; and
   a camera module having a video camera for mounting to the interior surface of the body panel and configured to receive from the mirror module one of the s-polarized and the p-polarized component of the incident light and selectively display the at least one FOV within the interior compartment.

2. The multi-directional viewing camera system according to claim 1, wherein the camera module additionally includes an electronically controlled polarizer arranged between the video camera and the polarizing beam splitter and configured to selectively transmit and reflect light.

3. The multi-directional viewing camera system according to claim 2, wherein the electronically controlled polarizer is a liquid crystal optical element.

4. The multi-directional viewing camera system according to claim 2, wherein the at least one FOV includes at least two of individually selectable rearward, side, and forward FOV's.

5. The multi-directional viewing camera system according to claim 4, further comprising an electronic controller configured to regulate voltage across the polarizer to selectively transmit and reflect light, and thereby facilitate switching between the at least two of the individually selectable rearward, side, and forward FOV's.

6. The multi-directional viewing camera system according to claim 4, wherein the mirror module additionally includes a first polarizing filter configured to transmit the s-polarized component of the incident light, arranged perpendicular to the body panel, and facing the rearward FOV to receive the incident light.

7. The multi-directional viewing camera system according to claim 6, further comprising a light blocker arranged parallel to the first polarizing filter and configured to select between a light passing mode and a light blocking mode, wherein the light passing mode is configured to facilitate displaying the rearward FOV and the light blocking mode is configured to facilitate displaying the forward FOV.

8. The multi-directional viewing camera system according to claim 6, wherein the mirror module additionally includes a second polarizing filter configured to transmit the s-polarized component of the incident light, arranged perpendicular to the body panel, and facing the forward FOV to receive the incident light.

9. The multi-directional viewing camera system according to claim 8, wherein:
   the mirror module additionally includes a polarization mirror and a quarter wave plate arranged sequentially relative to the incident light from the side FOV and parallel to the body panel;
   the polarization mirror is facing the side FOV to receive the incident light therefrom; and
   the polarizing beam splitter is arranged between the video camera and the quarter wave plate.

10. The multi-directional viewing camera system according to claim 9, wherein the polarization mirror is electronically controlled and configured to selectively transmit and reflect light, and wherein the quarter wave plate is configured to add a constant phase factor to polarized light transmitted by the polarization mirror.

11. A motor vehicle comprising:
   a vehicle body defining an interior compartment and including a body panel having an exterior surface and an interior surface facing the interior compartment; and
   a multi-directional viewing camera system including:
      a mirror module mounted to the exterior surface of the body panel, configured to capture and transmit incident light from at least one field of view (FOV), and having a polarizing beam splitter configured to reflect s-polarized component of the incident light in a visible spectral range and transmit p-polarized component of the incident light in the visible spectral range; and
      a camera module having a video camera mounted to the interior surface of the body panel and configured to receive from the mirror module one of the s-polarized and the p-polarized component of the incident light and selectively display the at least one FOV within the interior compartment.

12. The motor vehicle according to claim 11, wherein the camera module additionally includes an electronically controlled polarizer arranged between the video camera and the polarizing beam splitter and configured to selectively transmit and reflect light.

13. The motor vehicle according to claim 12, wherein the electronically controlled polarizer is a liquid crystal optical element.

14. The motor vehicle according to claim 12, wherein the at least one FOV includes at least two of individually selectable rearward, side, and forward FOV's.

15. The motor vehicle according to claim 14, further comprising an electronic controller configured to regulate voltage across the polarizer to selectively transmit and reflect light, and thereby facilitate switching between the at least two of the individually selectable rearward, side, and forward FOV's.

16. The motor vehicle according to claim 14, wherein the mirror module additionally includes a first polarizing filter configured to transmit the s-polarized component of the incident light, arranged perpendicular to the body panel, and facing the rearward FOV to receive the incident light.

17. The motor vehicle according to claim 16, wherein the first polarizing filter is electronically controlled to select between a light passing mode and a light blocking mode, and wherein the light blocking mode is configured to facilitate displaying the forward FOV.

18. The motor vehicle according to claim 16, wherein the mirror module additionally includes a second polarizing filter configured to transmit the s-polarized component of the incident light, arranged perpendicular to the body panel, and facing the forward FOV to receive the incident light.

19. The motor vehicle according to claim 18, wherein:
   the mirror module additionally includes a polarization mirror and a quarter wave plate arranged sequentially relative to the incident light from the side FOV and parallel to the body panel;
   the polarization mirror is facing the side FOV to receive the incident light therefrom, and wherein the polarizing beam splitter is arranged between the video camera and the quarter wave plate;

the polarization mirror is electronically controlled and configured to selectively transmit and reflect light; and the quarter wave plate is configured to add a constant phase factor to polarized light transmitted by the polarization mirror.

20. A motor vehicle comprising:

a vehicle body defining an interior compartment and including a body panel having an exterior surface and an interior surface facing the interior compartment; and a multi-directional viewing camera system including:

a mirror module mounted to the exterior surface of the body panel, configured to capture and transmit incident light from at least one individually selectable rearward, side, and forward fields of view (FOV's), and having a polarizing beam splitter configured to reflect s-polarized component of the incident light in a visible spectral range and transmit p-polarized component of the incident light in the visible spectral range; and a camera module having a video camera mounted to the interior surface of the body panel, having an electronically controlled polarizer arranged between the video camera and the polarizing beam splitter and configured to selectively transmit and reflect light, and configured to receive from the mirror module one of the s-polarized and the p-polarized component of the incident light and selectively display the at least one of the individually selectable rearward, side, and forward FOV's within the interior compartment.

* * * * *